Jan. 6, 1953     H. E. SMITHSON     2,624,310
BIRD CAGE ACCESSORY
Filed April 11, 1950
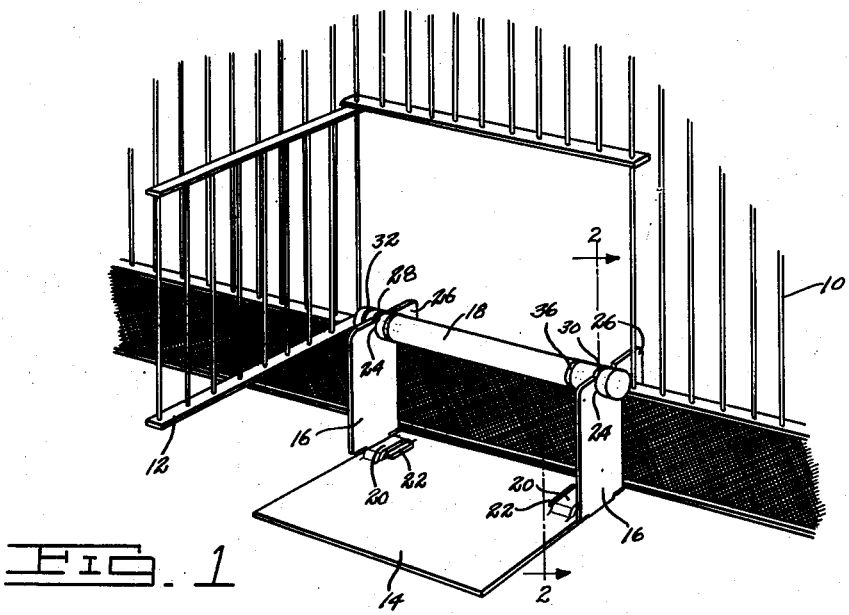
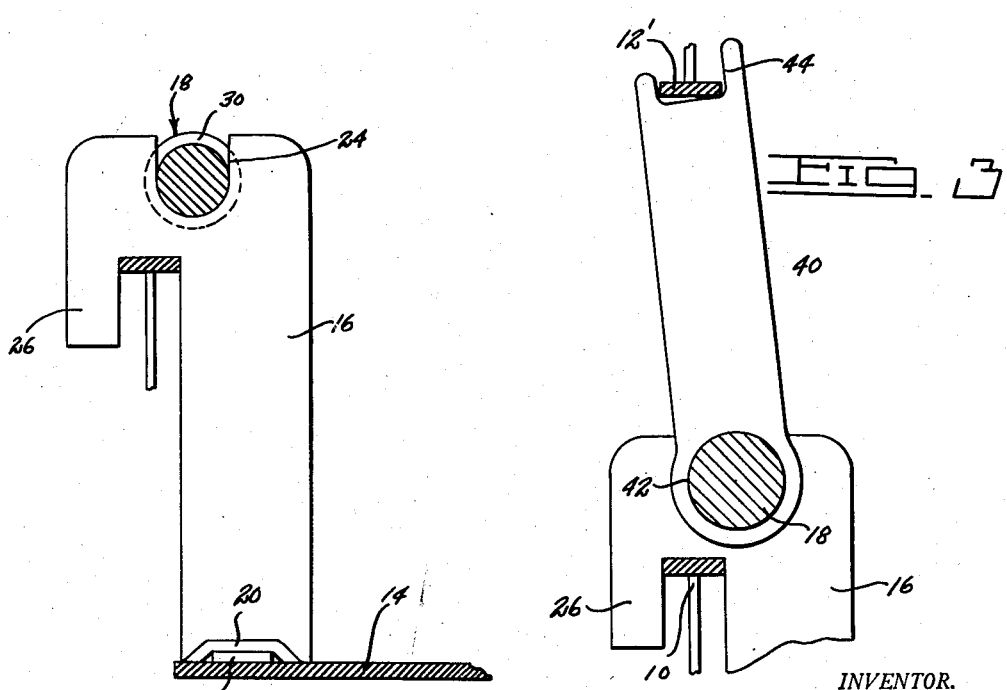
INVENTOR.
HARRY E. SMITHSON
ATTORNEY Patented Jan. 6, 1953

2,624,310

UNITED STATES PATENT OFFICE 2,624,310

BIRD CAGE ACCESSORY

Harry E. Smithson, Detroit, Mich.

Application April 11, 1950, Serial No. 155,143

2 Claims. (Cl. 119—17)

This invention relates to a bird exerciser and more particularly to an accessory for a bird cage which may be applied to the cage, exteriorly of the cage and below the door opening, which will provide a perch and auxiliary floor or platform outside the cage.

It is an object of the present invention to provide a removable device which may be attached to the exterior of the cage or the door sill for holding the door in its open position.

Another object of the invention is to provide an adjustable device which will fit various sizes of door openings and adapted to be adjusted to hold the door in fully open position, that is, open to at least 90° from its closed position.

A further object of the invention is to construct the device of inter-engaging parts which may be assembled and disassembled without the aid of tools or separate fastening devices.

Other objects and advantages of the invention will more fully appear from the following description taken in connection with the accompanying drawings in which:

Fig. 1 is a perspective view of a fragmentary portion of a bird cage, showing the improved accessory applied to the open swinging door of the cage;

Fig. 2 is a sectional view of the device, taken on line 2—2 of Fig. 1, showing the supporting arm, its connection to the floor, and the means for securing a perch to the supporting arms, and Fig. 3 is a fragmentary view similar to Fig. 2 showing a modification of the invention.

It is common practice with bird owners to permit the birds, particularly birds of the parrot family such as parakeets, to have egress and ingress to the cage and often the bird roosts on the door sill facing inwardly of the cage and the droppings fall in undesirable places. When the cage door is opened, separate holding devices are required to hold the door in open position.

The present invention provides a device which embodies a floor extending outwardly from the cage below the door opening for catching droppings, provides a feeding shelf, provides a perch for the bird, and at the same time is adjustable to retain the door in open position.

Another advantage of the device is that it may be positioned on the outside of the cage for retaining the door in closed position when the latter is not in use. Usually cage doors are provided with spring closing means or additional latching means for retaining the door in closed position. These, however, often become broken and it is necessary to improvise some means for retaining the door closed. The improved device may be applied to the cage over the closed door to securely retain it in closed position.

Referring to the drawings, I have shown a conventional cage 10 having a swinging door 12. The cage is shown in Fig. 1 with the door open. The improved accessory comprises a floor portion 14, supporting arms 16 and a perch 18. The floor is of a flat sheet material such as sheet metal, preferably aluminum. This sheet may be of any desired shape, herein illustrated as rectangular, and is adapted to be suspended in a horizontal plane. At the opposite sides of the sheet and adjacent the rear edge of the sheet, there are stamped out portions 20 which are formed by cutting a pair of parallel slots in the metal and pressing the portion of material between each pair of slots out of the plane of the sheet. This provides a pair of laterally accessible slots, between the pressed out portions and the body of the sheet, for receiving projections 22 carried by the supporting arms 16.

The arms 16 are preferably formed from flat sheet metal stock and the projections 22 are of reduced width and bent at right angles to the plane of the arms 16 to slidingly fit one of the grooves formed by the pressed out portion 20. The opposite ends of the arms 16 are provided with semi-circular cut out portions 24 in the upper edge thereof. The rear edge of each arm is provided with a hook 26 which is extended rearwardly of the arm and projects downwardly in spaced relation to the body of the arm 16. These arms 16 are formed by stamping and are identical except that the projections are bent in opposite directions so that when the arms 16 are assembled to the floor 14 the projections 22 may be inserted from the outer edges with the plane of the arms 16 flush with the edges of the floor and the hooks 26 extending rearwardly.

The perch 18 is preferably made of wood and is in the form of a rod having a length greater than outer distance between the two assembled supports 16. Circular grooves 28 and 30 are formed in the outer periphery of the perch. These grooves have a width substantially equal to the thickness of the material forming the arms 16 so that the cut out portion 24 snugly fits the groove. Additional grooves 32, 34 and 36 are provided in the outer periphery of the perch, so that the latter may be positioned in the cut out portions at various longitudinal distances. It will be noted that the groove 30 is axially spaced a greater distance from one end of the perch than the groove 32 from the opposite end of the perch. The groove 36 is positioned a greater distance from one end of the perch than the grooves 32 and 28. This arrangement of grooves provides longitudinal adjustment of the perch relative to the supports so that variations in the overhang at one end of the perch may be made greater or lesser depending upon the distance of the one support away from the swinging door. The perch may be positioned end for end and the proper grooves selected to hold the door in a fully open position. In connection with the above, it is to be understood that there are slight variations in the width of openings in different cages and it is desirable to have the support, away from the door, rest against a bar of cage so that it can not move laterally and at the same time have the opposite end of the perch engage a fully open door. This provides a positive stop between the remote bar of the cage opening and the door.

There is a further adjustment obtainable by providing the irregularly spaced grooves, that is, the provision of means for varying the lateral spacing of the supports 16. Since the supports 16 are slidably received in the grooves formed by the stamped out portions 20 they may be positioned inwardly or outwardly relative to each other for variations in the distance between the hooks 26. This permits the hooks 26 to be fitted between, and preferably bearing laterally against, one of the bars when the end of the perch 18 is in engagement with the open door.

In the form of the invention shown in Fig. 3, I have shown a device for holding a sliding door in its raised position. Pivotally carried on the perch 18 is an arm 40, preferably formed from sheet metal which is stamped to desired shape. One end of the arm is provided with a circular opening 42 which fits the outer periphery of the perch 18. The opposite end of the arm is notched, as at 44, to form a recess for the bottom of the sliding door 12'. When the device is applied to the outside of a cage having a sliding door, the door is raised and the hooks 26 applied over the door sill. The arm 40 is then swung upwardly and the door drops into the notch 44.

While I have illustrated and described a preferred embodiment of the invention, it will be understood that various changes, including the size, shape and arrangement of parts, may be made without departing from the spirit of my invention and it is not my intention to limit its scope other than by the terms of the appended claims.

I claim:

1. An attachment for a bird cage comprising, a floor, vertical supports detachably received in said floor, each at the opposite sides thereof, hooks on the rear edge of said supports, the upper edge of said supports having a notch, and a perch having spaced peripheral grooves to be received in the notches of said support.

2. An attachment for a bird cage comprising, a floor, outwardly extending portions in the body of said floor forming tab receiving portions, lateral supports having projections for engagement with the outwardly pressed portions of said floor, hooks carried by said supports, and a perch removably received on the upper edge of said supports, said perch having grooves in its outer peripheral surface adjacent the opposite ends thereof for receiving the upper edges of said supports, said grooves being spaced longitudinally at varying distances whereby variations in the distance between said supports and the distance from one end of said perch to the outer surface of its adjacent support may be varied.

HARRY E. SMITHSON.

REFERENCES CITED

The following references are of record in the file of this patent:

UNITED STATES PATENTS

| Number | Name | Date |
| --- | --- | --- |
| 181,526 | Fischer | Aug. 29, 1876 |
| 1,102,794 | Perkins | July 7, 1914 |
| 1,806,352 | Jensen et al. | May 19, 1931 |
| 1,874,708 | Palubiak | Aug. 30, 1932 |
| 2,275,914 | Lorenz | Mar. 10, 1942 |